(No Model.) 7 Sheets—Sheet 1.

J. F. SLEEPER & J. P. MILLER.
STRAIGHT FASHIONING KNITTING MACHINE.

No. 440,903. Patented Nov. 18, 1890.

WITNESSES
Chas. Spaulding
Charles E. Moss.

INVENTOR
J. F. Sleeper
J. P. Miller
By Wright, Brown & Crossley (No Model.) 7 Sheets—Sheet 2.

J. F. SLEEPER & J. P. MILLER.
STRAIGHT FASHIONING KNITTING MACHINE.

No. 440,903. Patented Nov. 18, 1890.

(No Model.) 7 Sheets—Sheet 3.
J. F. SLEEPER & J. P. MILLER.
STRAIGHT FASHIONING KNITTING MACHINE.

No. 440,903. Patented Nov. 18, 1890.

WITNESSES
Chas. Spaulding
Charles O. Moss

INVENTOR
J. F. Sleeper
J. P. Miller (No Model.) 7 Sheets—Sheet 4.

J. F. SLEEPER & J. P. MILLER.
STRAIGHT FASHIONING KNITTING MACHINE.

No. 440,903. Patented Nov. 18, 1890.

WITNESSES
Chas. Spaulding
Charles E. Moss.

INVENTOR
J. F. Sleeper
J. P. Miller
By
Wm. Brown Crossley
atty (No Model.) 7 Sheets—Sheet 5.

J. F. SLEEPER & J. P. MILLER.
STRAIGHT FASHIONING KNITTING MACHINE.

No. 440,903. Patented Nov. 18, 1890.

WITNESSES
Chas. Spaulding
Charles E. Moss

INVENTOR.
J. F. Sleeper
J. P. Miller (No Model.) 7 Sheets—Sheet 6.
J. F. SLEEPER & J. P. MILLER.
STRAIGHT FASHIONING KNITTING MACHINE.
No. 440,903. Patented Nov. 18, 1890.

WITNESSES.
Chas. Spaulding
Charles E. Moss.

INVENTOR.
J. F. Sleeper
J. P. Miller

Fig. 19.

UNITED STATES PATENT OFFICE.

JOSEPH F. SLEEPER AND JOHN P. MILLER, OF LACONIA, NEW HAMPSHIRE, ASSIGNORS TO FRANK P. HOLT, OF SAME PLACE.

STRAIGHT-FASHIONING KNITTING-MACHINE.

SPECIFICATION forming part of Letters Patent No. 440,903, dated November 18, 1890.

Application filed April 16, 1889. Serial No. 307,449. (No model.)

*To all whom it may concern:*

Be it known that we, JOSEPH F. SLEEPER and JOHN P. MILLER, of Laconia, in the county of Belknap and State of New Hampshire, have invented certain new and useful Improvements in Straight-Fashioning Knitting-Machines, of which the following is a specification.

Our invention relates to knitting-machines provided with means for transferring stitches—that is, means whereby the stitches or loops on certain needles may be taken from such needles and deposited upon certain other needles to effect a widening or narrowing of the fabric being knit.

We have chosen a machine such as is shown and described in United States Letters Patent No. 187,696, granted February 27, 1877, and commonly known as an "Abel" knitting-machine, to illustrate and explain the nature of our invention and manner of using the same, though it will be manifest to those skilled in the art, after a description of our said invention shall have been given, that it may in whole or in part be applied to knitting-machines generally which are designed to knit shaped or fashioned fabrics. We have, moreover, chosen to explain our invention as used in the process of knitting stockings having fashioned legs and fashioned "French" feet with "box" narrowings at the toes, though it will appear obvious that said invention may be employed in the production of other articles of apparel.

It is the object of our invention to provide readily operated and efficient means whereby the narrowing may be effected at or near the edges of the fabric being knit or at any desired distance inward from the edges, as circumstances or taste may demand or suggest.

It is also the object of our invention to provide simple and efficient means whereby box-narrowing may be effected—as, for example, in knitting the toe portions of stockings.

It is also the object of our invention to provide means for knitting-machines in which such needles as are deprived of loops or stitches are thrown out of operation, whereby all or substantially all of such needles may be withdrawn from operation and narrowing may be effected from the edges to the center of the fabric.

It is also the object of our invention to provide other improvements incidental to what has been recited hereinbefore, as will appear from the description hereinafter given.

The invention itself consists in various improved means of effecting these objects, more particularly set forth hereinafter.

Reference is to be had to the accompanying drawings and the letters, figures, and signs of reference marked thereon, the same letters figures, or signs designating the same parts or features, as the case may be, in all of the views forming a part of this specification, of which drawings—

Fig. 16 is a front view of our improved needle-depressing slides. Fig. 18 is a top view of the slide-supporting bar. Figs.

18$^a$ and 18$^b$ are sectional views of the same.

Our invention, as hereinbefore stated, is here shown as adapted to be applied to an Abel knitting-machine organized substantially as illustrated and described in the patent mentioned in the beginning of this specification, and reference may be had to said patent for a fuller understanding of the prime actuating means for the several parts which may be employed, as also a way in which a proper timing of operation of the devices may be secured, though, as already explained and as will appear evident, our invention and parts thereof may be embodied in other machines.

In the drawings, $a$ designates the needles, supported on the needle-bar $b$ and adapted to be reciprocated in the grooves formed in said needle-bar by the cams (not shown) of common construction on the reciprocating cam-bar $c$. The needle-grooves in the needle-bar $b$ are deeper at their forward than at their rear ends, as in the machine shown in the reissued patents, Nos. 8,779 and 10,112, granted, respectively, July 1, 1879, and May 16, 1882, so as to permit the forward ends of the needles to be depressed and so rendered inoperative.

$d$ are the narrowing-points, arranged in groups or sections on the rocking bar $e$ at the ends of the row of operative needles, and $f$ are the intermittingly-moving arms, whereby the narrowing-points are from time to time shogged inward to effect the carrying of the stitches taken by the points from certain needles inward to be deposited on certain other needles.

Figure 1:
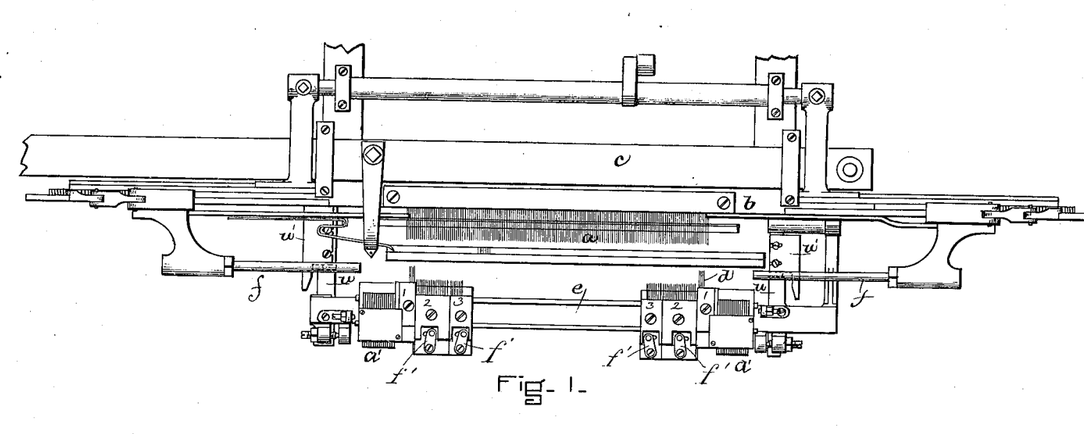
Figure 1 represents a top view of so much of an Abel knitting-machine as is necessary to explain our improvements, which are embodied therein, the narrowing-points being shown as adjusted so as to effect narrowing upon one or more needles from the edges inward.
Figure 2:
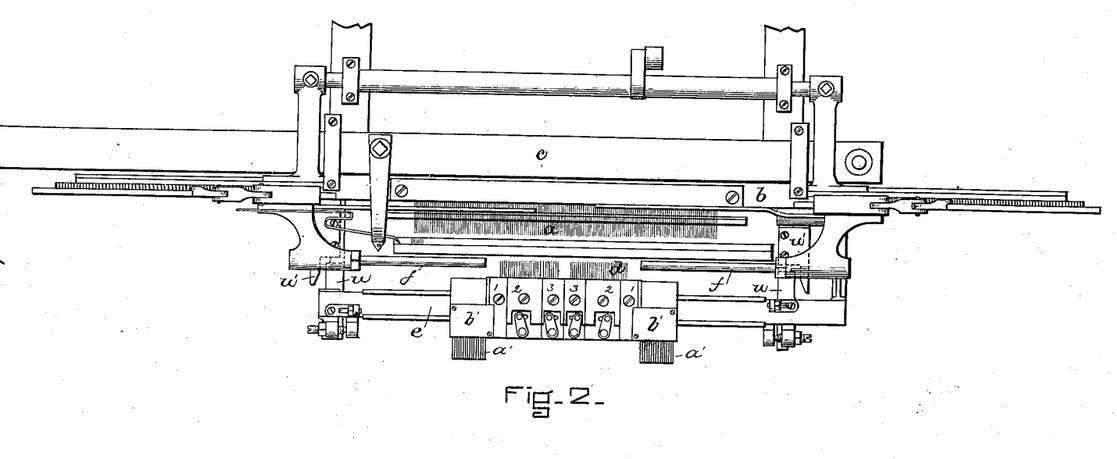
Fig. 2 is a top plan view similar to Fig. 1, showing all of the narrowing-points in operation and narrowing as having been effected as near as may be to the center.

The narrowing-points at each end of the rank or row of needles in operation are here shown as constructed in three groups or sections 1 2 3, the group 1 being capable of being moved longitudinally on the rocking bar $e$, while the sections or groups 2 3 are capable not only of longitudinal movement on the rocking bar but adjustment on a line transverse of said bar—that is, in planes passing through the line of said bar—as will be understood by an inspection of Figs. 1 and 2, the sections 2 3 being shown in Fig. 1 as adjusted in their rearward or inoperative position and in Fig. 2 as in their forward or operative position.

The adjustment of the groups 2 3 of narrowing-points is effected by means of levers $f'$, pivoted at one end to the sliding beds $g$, upon which said groups of points are mounted, a downwardly-extending pin $h$ in the other end of each of said levers extending through a slot in the bed $g$ and into a slot or groove $s^a$ in the support $i$ for the said bed $g$.

Figure 7:
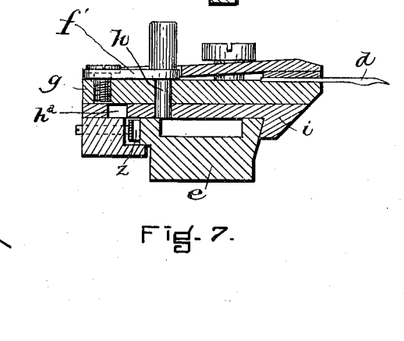
Fig. 7 is a sectional view taken on the line 7 7 of Fig. 3.
Figure 8:
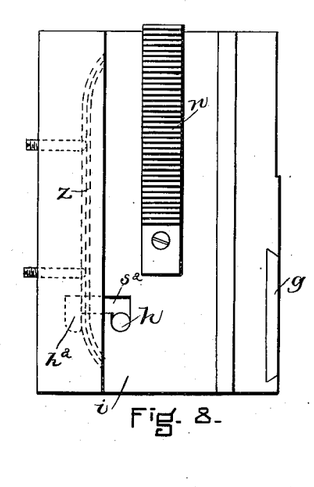
Fig. 8 is a bottom view of the rack-bar and adjunctive devices supporting the narrowing-points which are adapted to be shogged.

By reference to Figs. 7 and 8 of the drawings the construction used may be clearly seen, the parts being delineated in these figures in the position they occupy when the narrowing-points are thrown forward in operative position. To throw them out of operation the stud $h$ is moved to the right out of the offset part of the slot $s^a$, in which it is shown in Fig. 8, (the figure being a bottom view, this motion appears reversed,) into the long part of the slot $s^a$. In this it is drawn back, drawing with it the points, until it reaches the transverse or offset part $h^a$ of the said slot, into which it is passed, securing the points out of operation.

If it is desired to effect narrowings near the edge of the fabric being knit, the groups 2 3 of narrowing-points will be adjusted out of operative position and narrowing performed with the group 1 alone, as shown in Fig. 1. If it is desired that the line of narrowing should be accomplished at a point farther in from the edge, the group 2 will be brought into operation with the group 1, and if narrowing at a point still farther in from the edge is desired group 3 will be brought into operation with groups 1 and 2, as shown in Fig. 2.

Figures 16, 18, 18A, 18B:
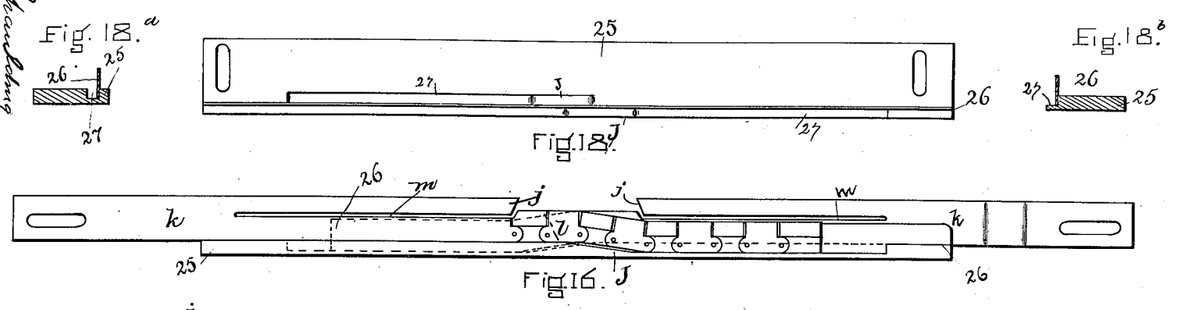
Figure 17:
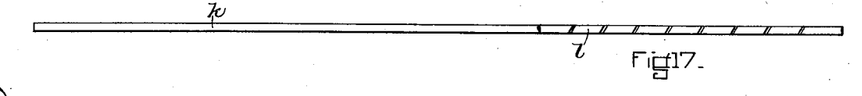
Fig. 17 is a top view of one of the slides.

As fast as needles at the ends of the rank or row are permanently deprived of loops or stitches they are depressed and rendered inoperative, as in the patented machine referred to, by engagement with the inclines $j$ of the slides $k$, which slides move horizontally on top of bar 25 and vertically in the grooves 27 in the supporting-bar 25, the lip 26 of said bar forming a support or stay to the needles in their lower position. These inclines carry the needles from their supports $l$ of said slides down into the grooves $m$; and in order to permit of the depression of all of the needles from the ends of the row to the center we construct the needle-supporting portions $l$ of the slides $k$ in sections jointed or hinged together on horizontal pivots, as shown in Figs. 16 and 17, so that as said needle-supporting sections pass the center of the row of needles they may be depressed successively sufficiently to bring their upper surfaces on a plane with the grooves $m$ in the slides, and so avoid interference by one slide with needles which have been depressed by the other, as would be the case if this provision were not made, this being shown most clearly in Fig. 16. From an inspection of this figure, together with Figs. 17 and 18, the construction used will be manifest. In Fig. 16 the slide $k$, having sectional parts $l$, (shown in solid lines,) moves from left to right, while the other slide (the sections of which are not clearly shown, but indicated by dotted lines) moves from right to left. As each one of the sections $l$ passes the center of its track or support it slides down the incline $J$ appropriate to its slide to a part of its track which is lower than the portion on which it has been moving by an amount just sufficient to depress the upper surface of each section $l$ to the plane of the groove or slot $m$ of the other slide, as before pointed out. The two slides being similar, their action is identical, except that they move in opposite directions. That the needles may have a level bearing on the sectional portions of the slides, we give the abutting ends of the sections an angular form with respect to the direction of movement of the needles, as will be seen by reference to Fig. 17.

Figure 5:
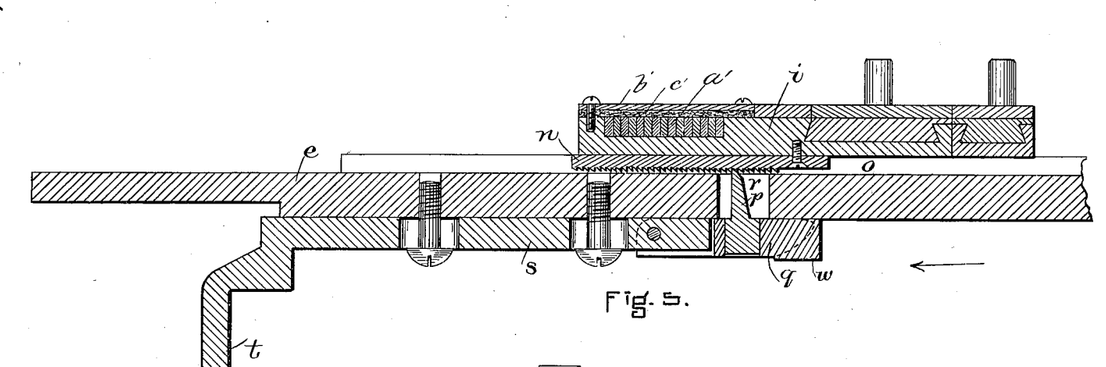
Fig. 5 is a sectional view taken on the line 5 5 of Fig. 4.
Figure 6:
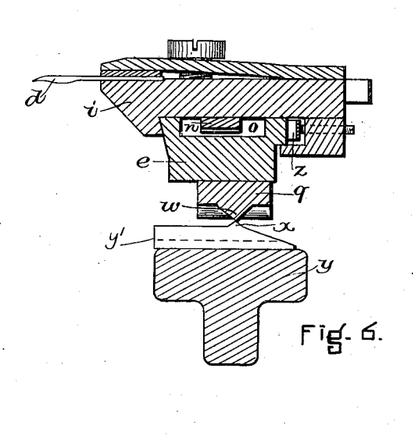
Fig. 6 is a sectional view taken on the line 6 6 of Fig. 4.

The supports $i$ for the groups 1 and 2 of narrowing-points $d$ are provided on their under surfaces each with a rack-bar $n$, arranged to move in a groove $o$, formed in the upper surface of the rocking bar $e$, and a pawl $p$, connected with the free end of a weighted block or lever $q$ and extending up through a slot $r$, formed in the rocking bar $e$, is arranged to be engaged with and released from the teeth or notches formed in said rack-bar $n$. The pawl-carrying block $q$ is pivoted to a slide $s$, arranged to be reciprocated beneath the rocking bar $e$, said slide $s$ being provided at its outer end with a pendent arm $t$, arranged to engage the cams or inclines $u$ $u'$, Fig. 11, on a bracket $v$, connected with a stationary part of the machine, so that as the rocking bar moves backward or outward the arm $t$ will strike the cam $u$ and move the slide $s$ outward in the direction of the arrow, Fig. 5, and when the rocking bar $e$ moves forward or inward the arm $t$ will strike the incline or cam $u'$ and move slide $s$ inward, or in a direction opposite to the arrow in Fig. 5.

Figure 9:
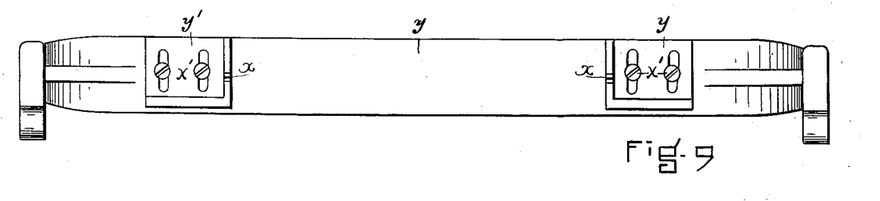
Fig. 9 is a top view of the swinging arm beneath the rocking bar carrying the narrowing-points.
Figures 10, 11:
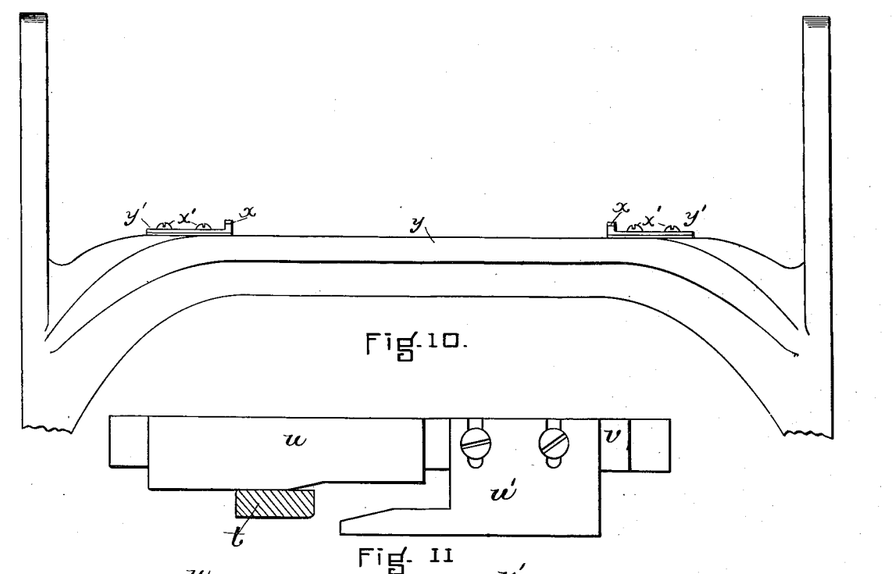
Fig. 10 is a front view of the arm shown in Fig. 9.
Fig. 11 is a top view of the cams for actuating the pawl-carrying bar, whereby certain of the narrowing-points are shogged.
Figure 12:
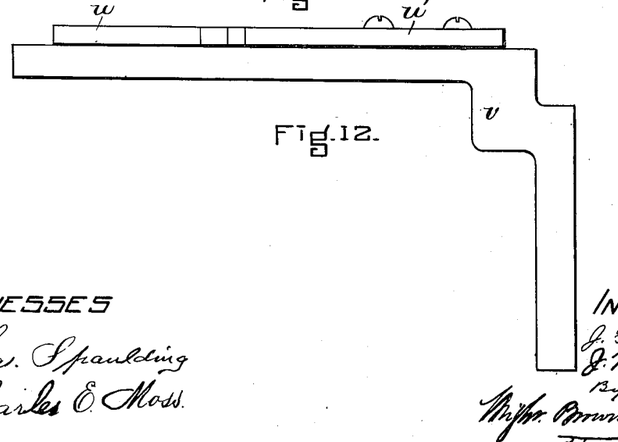
Fig. 12 is a front view of the parts shown in Fig. 11.

The block $q$ is provided on its under side with a V-shaped lug $w$, adapted as the rocking bar $e$ is moved to ride over an inverted-V-shaped lug $x$, formed on a plate $y'$, adjustably connected, by means of the set-screws $x'$, working in slots, with the upper surface of the frame $y$, all of which is fully delineated in Figs. 9 and 10 of the drawings. The parts last described are so timed in their movements that the point of the lug $w$ will be upon the highest point of the lug $x$ at the time that the arm $t$ engages the incline or cam $u$, thus engaging pawl $p$ with the teeth of rack-bar $n$ and moving the latter and the groups 1 2 of points $d$ outward a distance corresponding to the space between one needle and the next.

$z$ designates a spring connected with the rocking bar $e$ and arranged to bear against the supports $i$ for the groups 1 2 of points $d$ frictionally to hold said supports against accidental displacement and against the momentum occasioned by the operation of pawl $p$.

Figure 3:
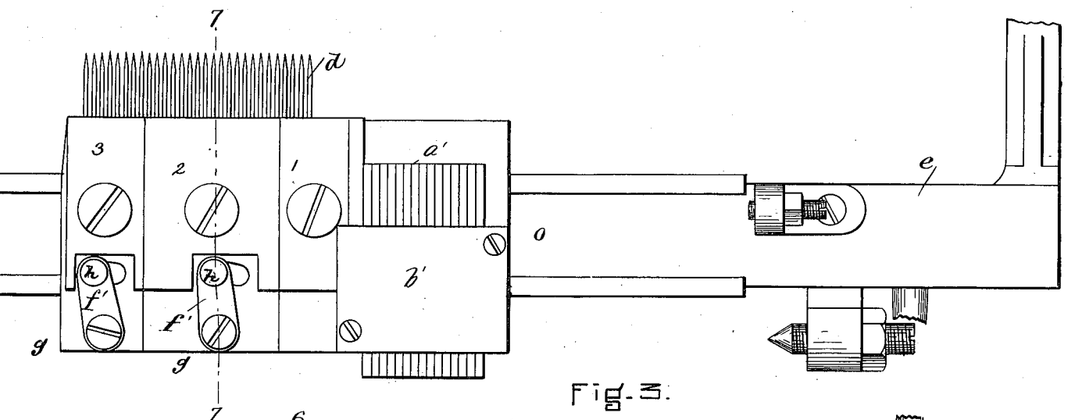
Fig. 3 is a top view, drawn to an enlarged scale, of one set of narrowing-points and their adjunctive devices.
Figure 4:
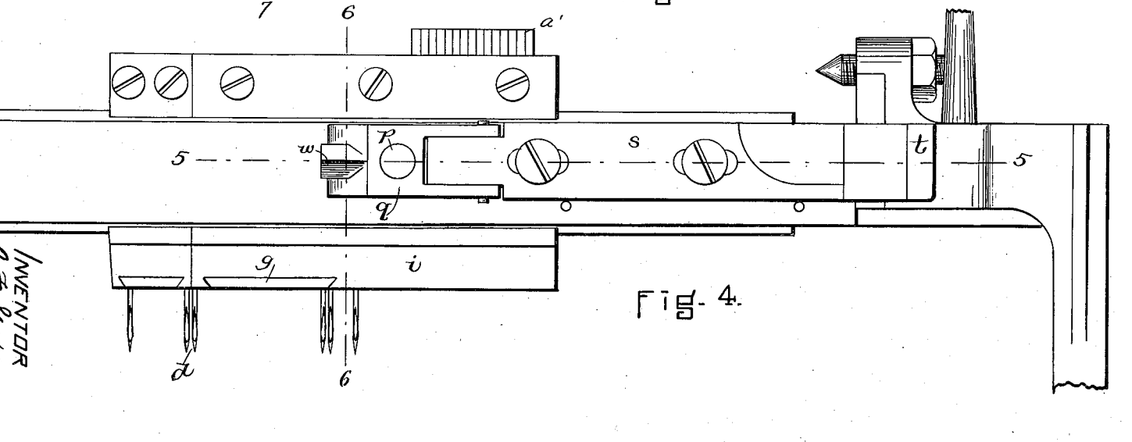
Fig. 4 is a bottom view of the parts shown in Fig. 3.
Figure 13:
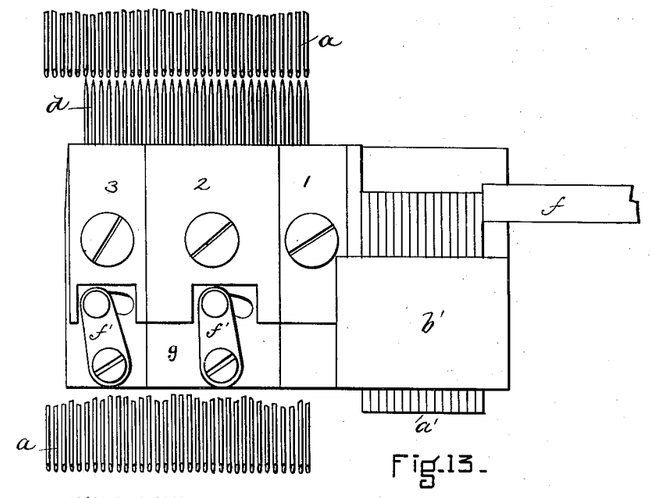
Figs. 13, 14, and 15 are diagrams showing the steps pursued in effecting box-narrowing with our improvements.
Figure 14:
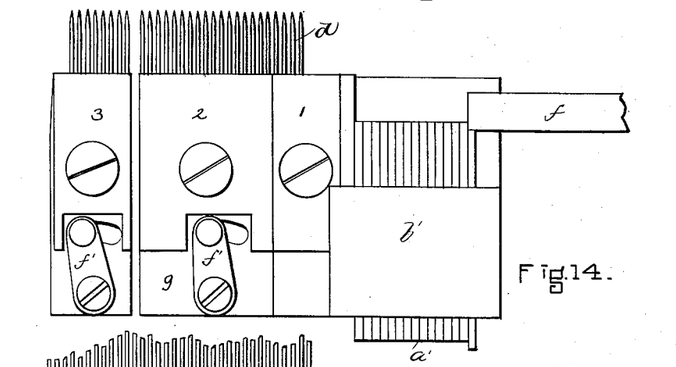
Figure 15:
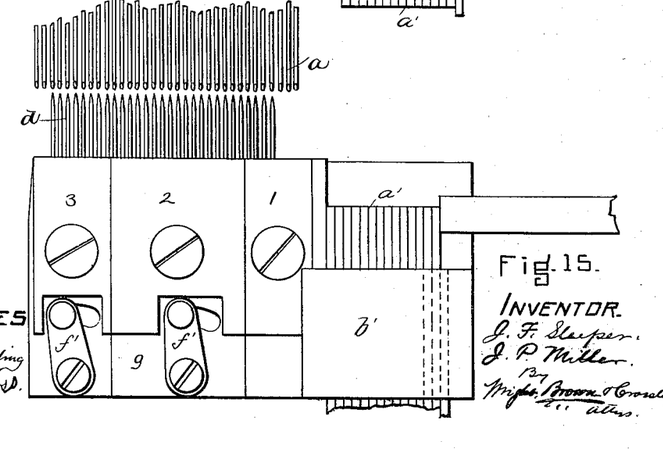

$a'$ designates slides supported on the bed $i$ and frictionally held in place by the cap-plate $b'$ and strip of felt $c'$, or similar material. These slides $a'$ are so constructed and positioned that the shogging-arm $f$ may act thereupon and thereagainst. Each slide $a'$ occupies a space corresponding to that between one needle and the next. If now all of the narrowing-points should be brought into operation, as clearly shown in Figs. 3 and 13, and said points should be operated to take up the stitches from certain needles, the shogging-arm $f$ will be brought to operate against the slides $a'$ and move the groups 1 2 3 of points inward a distance corresponding to the space occupied by two of the slides $a'$, which is equivalent to the space occupied by two needles, when the points will be operated to deposit the loops or stitches taken by them on the needles opposite the same, which will be, as to each loop or stitch, the second needle inward from that from which such loop was taken. When the rocking bar $e$ moves back, the slide $s$ and pawl $p$ will be so operated as to shog the groups 1 2 of points $d$ outward a distance corresponding to the space occupied by a single slide $a'$, so that the next time the rocking bar and points move forward the outermost slide $a'$ will strike against the end of arm $f$ and be moved back, as shown in Fig. 14, the result being that the needle falling in position between groups 2 and 3 of points $d$ will not have the loop or stitch taken therefrom, but will have the loop on the next outside needle carried past the same and deposited on the next inside needle, the arm $f$ moving to shog the groups 1 2 of points inward a distance occupied by two slides $a'$, as before, one-half of the extent of such movement bringing the groups 1 2 back to position against group 3 and the remainder of such movement serving to shog all three of the groups of points inward a distance corresponding to the space occupied by a single slide $a'$. Thus it will be seen that by a repetition of these movements the groups 1 2 of points will be moved outward a distance corresponding to the space occupied by a single slide $a'$ each time that the rocking bar goes back, and be shogged inward by the operation of arm $f$ a distance corresponding to the space occupied by two slides $a'$ after such groups of points shall have taken loops from needles opposite the same, while the group 3 of points $d$ will be shogged inward the distance only corresponding to the space occupied by a single slide $a'$, the needle falling between the two groups 2 3 having no loops taken therefrom at any time, but having the loop on the next adjacent needle outward carried over the loop formed by such intermediate needle each time, forming a "twist" stitch on such needle.

Figure 19:
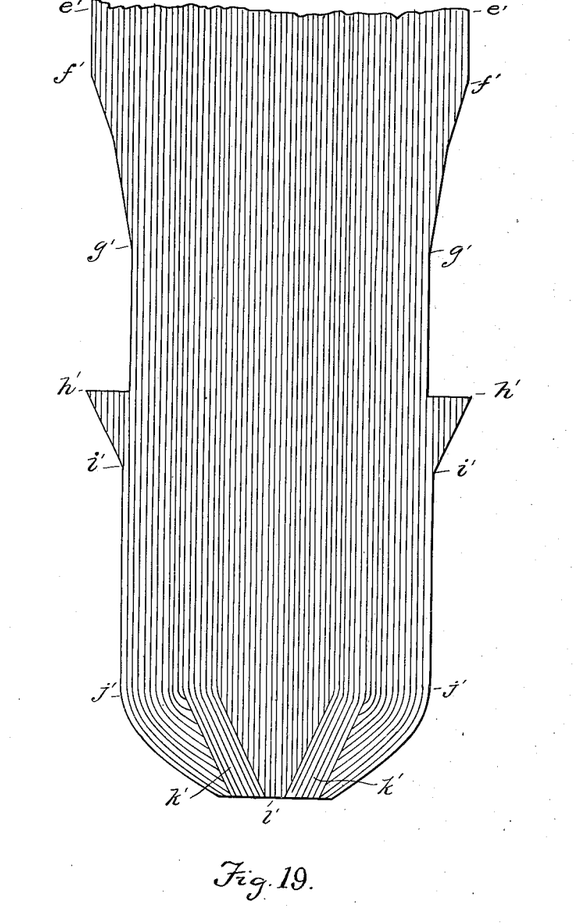
Fig. 19 is a diagram showing a stocking knit upon a machine embodying our invention, the manner of producing which is more particularly described hereinafter.

Referring to the diagram Fig. 19, we will explain the manner in which our invention may be employed in knitting a web suitable for use in the manufacture of a "French" foot stocking. Presuming that the work of knitting the leg portion of the stocking is in progress at the point $e'$, with all the needles in operation and the narrowing devices in inoperative position, knitting will be continued down to the line $f'$, when the group 1 of the narrowing-points may be brought into operation and narrowing effected in the regular way, as gradually or abruptly as may be desirable, until the line $g'$ is reached, where the formation of the ankle portion of the stocking is to be commenced. Here the narrowing operation will be suspended and a web of regular width for the ankle portion will be knit until the line $h'$ is reached, where the heel is to be inserted. Here such needles as were previously thrown out of operation, or as many thereof as may be needed, are brought into action again and narrowing is performed with group 1 of points $d$ until the line $i'$ is reached to form a gusset for the instep portion of the foot. A web of uniform width is then knit until the line $j'$ is reached to form the foot portion of the stocking. At the line $j'$ the groups 2 3 of the narrowing-points are brought into operation and narrowing is performed, as hereinbefore described, by shogging groups 1 and 2 of points $d$ inward a distance corresponding to the space occupied by two needles in the needle-bar and group 3 but half of said distance, then moving groups 1 and 2 back the distance that group 3 was shogged inward and repeating these operations at both ends of the rows of needles, whereby the box narrowings $k'$ $k'$ will be effected until the end $l'$ is reached, when the web may be cast off and the stocking finished in accordance with the method set forth in the patent granted to F. P. Holt on our petition dated November 19, 1889, and numbered 415,580.

If desired, group 2 or both groups 2 and 3 of points $d$ may be employed with group 1 in narrowing for the lower calf portion of the leg and in forming the gusset for the instep portion of the foot, such two or three groups of points being operated as one.

Having thus explained our invention, what we claim, and desire to protect by Letters Patent of the United States, is—

1. In a knitting-machine, in combination, the needles, a sectional slide for moving them into and out of operative position, and a supporting-bar for the slide constructed to provide for movement of the sections of said slide away from the plane of adjacent needles, substantially as described.

2. In a knitting-machine, a row of needles and a slide for raising and depressing them whereof the portion supporting the same in operative position is constructed in sections capable of vertical motion, in combination with a supporting-bar therefor constructed to provide for vertical movement of the sections of said slide, substantially as described.

3. In a knitting-machine, in combination, needles, a slide for raising and depressing them, and a supporting-bar for said slide constructed to provide for vertical movement of the sections thereof, a portion of the slide being formed in sections whereof the abutting vertical faces are formed at an angle to the line of motion of the needles, substantially as described.

4. In a knitting-machine, a straight row of needles combined with straight bars for supporting the needles in operative position and depressing them out of such position, the inner portions of said bars being constructed in sections adapted to be moved vertically, and a supporting-bar constructed to provide for vertical movement of such sections, substantially as described.

5. In a knitting-machine, in combination, a rocking bar, transferring or narrowing points assembled in groups or sections having motion longitudinally on the rocking bar, a shogging-arm, and slides such as described interposed between the shogging-arm and the groups or sections, substantially as described.

In testimony whereof we have signed our names to this specification, in the presence of two subscribing witnesses, this 10th day of April, A. D. 1889.

JOSEPH F. SLEEPER.
JOHN P. MILLER.

Witnesses:
S. S. JEWETT,
GEO. W. ROSS.